United States Patent [19]

Mori

[11] Patent Number: 4,655,944

[45] Date of Patent: Apr. 7, 1987

[54] SLIDING AND BEARING MATERIAL HAVING SUPERIOR WEAR RESISTING PROPERTY

[75] Inventor: Sanae Mori, Nagoya, Japan

[73] Assignee: Daido Metal Company Ltd., Nagoya, Japan

[21] Appl. No.: 790,760

[22] Filed: Oct. 23, 1985

Related U.S. Application Data

[63] Continuation of Ser. No. 554,472, Nov. 22, 1983, abandoned.

[30] Foreign Application Priority Data

Dec. 3, 1982 [JP] Japan .................................. 57-211277

[51] Int. Cl.$^4$ ................. C10M 147/02; C10M 147/04
[52] U.S. Cl. ..................................... 252/12.2; 252/12; 252/12.4; 252/12.6
[58] Field of Search ...................... 252/12, 12.2, 12.4, 252/12.6

[56] References Cited

U.S. PATENT DOCUMENTS

| | | | |
|---|---|---|---|
| 2,824,060 | 2/1958 | White | 252/12.2 |
| 3,376,183 | 4/1968 | Flynn et al. | 252/12.2 |
| 4,000,982 | 1/1977 | Ueda | 252/12.2 |
| 4,312,772 | 1/1982 | Mori | 252/12.2 |
| 4,394,275 | 7/1983 | Bickle et al. | 252/12 |

FOREIGN PATENT DOCUMENTS 080522  5/1984  Japan ................................. 252/12.2

*Primary Examiner*—Jacqueline V. Howard
*Attorney, Agent, or Firm*—Browdy and Neimark

[57] ABSTRACT

A sliding and bearing material having a superior wear resisting property, consisting of: a backing metal; an intermediate layer joined to the backing metal; a porous metallic layer joined to the intermediate layer; and a substance with which the porous layer is impregnated and/or coated, the substance being one of the following mixtures (A), (B) and (C):

(A) a first mixture consisting essentially of 0.1 to 50 vol % of at least one composition selected from a group consisting of ETFE, PVDF, PCTFE and EPE, and the balance substantially PTFE (B) a second mixture consisting essentially of 0.1 to 50 vol % in total of at least two compositions selected from a group consisting of FEP, PFA, ETFE, PVDF, PCTFE and EPE, and the balance substantially PTFE (C) a third mixture consisting essentially of 0.1 to 50 vol % of at least one composition selected from a group consisting of FEP, PFA, ETFE, PVDF, PCTFE and EPE; 0.1 to 35 vol % of at least one composition selected from a group consisting of solid lubricants such as a low-melting point metallic lubricant such as Pb, Sn or their alloys, metal oxides, metal sulfides, metal fluorides, graphite or the like, fibrous materials such as carbon fibers, and ceramics such as SiC; and the balance substantially PTFE, the total of contents of consituents other than PTFE being in the range between 0.2 and 70 vol %.

16 Claims, No Drawings

SLIDING AND BEARING MATERIAL HAVING SUPERIOR WEAR RESISTING PROPERTY This application is a continuation of application Ser. No. 554,472 filed Nov. 22, 1983, now abandoned.

The present invention relates to a bearing material having a superior wear resisting property.

Conventional sliding and bearing materials shown in the following references are pertinent to the present invention:

(1) U.S. Pat. No. 2,995,462 Specification,
(2) U.S. Pat. No. 4,312,772 Specification,
(3) German Laid-Open Patent Publication No. 3,229,667/1983, and
(4) U.S. Pat. No. 4,208,472 Specification The sliding and bearing materials shown in these literatures, however, could not provide satisfactory wear resisting property which is quite an important requisite for the material of slide bearing (plain bearing).

Accordingly, an object of the invention is to provide a sliding and bearing material having superior wear resisting property over the conventional bearing materials disclosed in the above-mentioned literatures.

To this end, according to the invention, there is provided a sliding and bearing material having a superior wear resisting property, consisting of: a backing metal; an intermediate layer joined to the back metal; a porous metallic layer joined to the intermediate layer; and a substance with which the porous layer is impregnated and/or coated, the substance being one selected from one of the following mixtures (A), (B) and (C):

(A) a first mixture consisting essentially of 0.1 to 50 vol % of at least one composition selected from a group consisting of tetrafluoroethylene-ethylene copolymer resin (hereinafter described as ETFE), vinylidene fluoride resin (PVDF), chlorotrifluoroethylene resin (PCTFE), fluoroethylene propylene ether resin (EPE), and the balance substantially polytetrafluoroethylene (PTFE), preferably the content of such one composition being 0.5–45 vol %;

(B) a second mixture consisting essentially of 0.1 to 50 vol % in total of at least two compositions selected from a group consisting of tetrafluoroethylenehexapropylene copolymer resin (FEP), tetrafluoroethyleneperfluoroalkylvinyl ether copolymer resin (PFA), ETFE, PVDF, PCTFE and EPE, and the balance substantially PTFE, preferably the content of such two compositions being 0.5–45 vol %;

(C) a third mixture consisting essentially of 0.1 to 50 vol % (preferably 0.5 to 40 vol % of at least one composition selected from a group consisting of FEP, PFA, ETFE, PVDF, PCTFE and EPE; 0.1 to 35 vol % (preferably 0.5 to 30 vol %) of at least one composition selected from a group consisting of solid lubricants such as a lowmelting point metallic lubricant, e.g. Pb, Sn or their alloys, metal oxides, metal sulfides, metal fluorides, graphic or the like, fibrous materials such as carbon fibers, and ceramics such as SiC; and the balance substantially PTFE, the total of contents of the compositions other than PTFE ranging between 0.2 and 70 vol % (preferably 0.5 to 60 vol %).

The backing metal may be a steel strip, while the intermediate layer is a copper-plating layer. The porous metallic layer may be a sintered layer of a Cu-Sn-Pb alloy or other Cu-base alloys.

An explanation will be given hereinunder as to the reasons of limitation as to the constituents of the impregnated and/or coated substance in the sliding and bearing material of the invention, i.e. the reasons of limitation of upper and lower limits of contents of the constituents of the substance, as well as the advantageous effects brought about by these constituents.

Referring first to the mixture A, the wear resisting property of the sliding and bearing material is seriously degraded when the content of one of the compositions ETFE, PVDF, PCTFE and EPE is less than 0.1 vol %. On the other hand, when the content of one of the compositions ETFE, PVDF, PCTFE and EPE exceeds 50 vol %, such composition becomes the major constituent so that the friction coefficient and friction temperature are increased undesirably to deteriorate the sliding and bearing performance, although the wear resisting property is improved. For these reasons, the content of the mixture A is selected to range between 0.1 and 50 vol %, preferably between 0.5 and 45 wt %.

Regarding the mixture B, the wear resisting property of the sliding and bearing material is seriously degraded when the total of contents of at least two compositions selected from the group consisting of FEP, PFA, ETFE, PVDF, PCTFE and EPE is less than 0.1 vol %. On the other hand, when the total of the contents thereof exceeds 50 vol %, the bearing performance is degraded due to increase in the friction coefficient and friction temperature. For these reasons, the total of contents of these at least two compositions is selected to range between 0.1 and 50 vol %, preferably between 0.5 and 45 vol %.

With regard to the mixture C, the content of at least one composition selected from the group consisting of a low-melting point metallic lubricant, solid lubricant, fibrous material and ceramics should be 0.1 vol % or greater, because otherwise the effect of addition of such a composition is not appreciable. On the other hand, when the content of at least one of these compositions exceed 35 vol %, the sliding and bearing material becomes too brittle to be used practically. Therefore, the content of at least one of these compositions should be 0.1 to 35 vol %, preferably 0.5 to 30 vol %, of the whole impregnating and coating substance.

When the total of the contents of constituents of mixture C is less than 0.2 vol %, the effect of addition of these constituents is not appreciable. When, on the other hand, the total of contents of these constituents exceeds 70 vol %, the sliding and bearing material becomes too brittle to be used practically and the combined effect produced by these constituents is lost while causing a rise in the friction coefficient and friction temperature to degrade the bearing performance. The total of the contents of these constituents, therefore, should be selected to fall within the range of between 0.2 and 70 vol %, preferably 0.5 and 60 vol %.

Examples of the metal oxides in the mixture C are PbO, $Al_2O_3$, $SiO_2$, $Pb_3O_4$, $TiO_2$, CdO, $Sb_2O_3$ and so forth, while examples of the metal sulfide in the mixture C are PbS, $MoS_2$, $WS_2$ and so forth. Metal fluorides such as $PbF_2$, $AlF_3$, $CdF_2$ and $BaF_2$ are usable as the metal fluoride in the mixture C. The fibrous material in the mixture C may be a natural or an artificial fibers such as carbon fibers, glass fibers, cotton (cellulose), asbestos, fibers of potassium titanate and so forth. Also, ceramic such as SiC, TiC, TiN, $B_4C$, BN and $Si_3N_4$ is usable as the ceramics in the mixture C.

Practical examples of the sliding and bearing material of the invention are shown below.

EXAMPLES

Backing metal of an ordinary structural carbon steel having a thickness of about 1.24 mm were plated with copper with a thickness of about 5 microns. A porous layer consisting of a Cu-Ti-Pb alloy was formed by sintering on the plated layer of each backing metal. Then, after application of substances shown in Table 1, the backing metals were rolled by use of rolls so that the pores of the porous layer of Cu-Sn-Pb alloy were filled with such substances and at the same time the surface of this layer was coated with the same, with the result that the surface of such substances shown in Table 1 is formed. Then, the backing metals having the impregnated porous layers were sintered by being held at a temperature of 327° to 400° C. for 2 to 5 minutes, and were rolled by use of rolls to obtain the sliding and bearing materials of the invention each having a total thickness of 1.50 mm. Conventional bearing materials were also prepared by the same method by use of conventional composition shown in Table 1, for comparison. In Table 1, sample Nos. 1 to 4 show the conventional bearing materials, while sample Nos. 5 to 31 represent the sliding and bearing material in accordance with the invention. These bearing materials were subjected to a wear resistance test conducted under the conditions shown in Table 2.

The backing metal as used in the invention of this application may be a metal other than steel. The backing metal may be devoid of the plating layer or may be plated with an alloy or metal other than Cu. The porous layer formed on the backing metal may be formed from metals or alloys other than Cu-base alloys such as the aforementioned Cu-Sn-Pb alloy or bronze. In the described example the porous layer is both impregnated and coated with the substances, however, the invention does not exclude such a case where the porous layer is only impregnated without providing a surface coating layer.

A description will be made as to the advantages brought about by the invention. As will be understood from Table 1, the test pieces (sample Nos. 5 to 31) of the sliding and bearing material of the invention exhibits superior resistance to wear over the conventional materials (sample Nos. 1 to 4). It will be seen that the test pieces of sample Nos. 5 to 31 well meet the aforesaid object of the invention.

The sliding and bearing material in accordance with the invention finds various uses such as the bearing of a mechanism which makes a reciprocatory sliding motion, e.g. hydraulic cylinder of automotive shock absorber, bearing for pump and other oil-lubricated bearing.

As has been described, the invention provides an improved sliding and bearing material which exhibits a superior wear resisting property and, hence, offers great practical and economical advantages.

What is claimed is:

1. A sliding and bearing material having a superior wear resisting property, consisting of:
   backing metal;
   an intermediate layer joined to said backing metal;
   a porous metallic layer joined to said intermediate layer; and

| | No. | PFA | FEP | PCTFE | ETFE | EPE | PVDF | Pb | Pb/Sn | PbF$_2$ | Al$_2$O$_3$ | MoS$_2$ | SiC | CF | PTFE | Amount of wear (μm) |
|---|---|---|---|---|---|---|---|---|---|---|---|---|---|---|---|---|
| Conventional materials | 1 | | | | | | | 20 | | | | | | | bal. | 22 |
| | 2 | | | | | | | | 14 | 8 | | | | | bal. | 9 |
| | 3 | 20 | | | | | | | | | | | | | bal. | 3.5 |
| | 4 | | 20 | | | | | | | | | | | | bal. | 5.9 |
| material of the invention | 5 | | | 20 | | | | | | | | | | | bal. | 2.8 |
| | 6 | | | | 20 | | | | | | | | | | bal. | 1.2 |
| | 7 | | | | | 20 | | | | | | | | | bal. | 0.4 |
| | 8 | | | | | | 20 | | | | | | | | bal. | 2.9 |
| | 9 | 0.5 | 0.5 | | | | | | | | | | | | bal. | 1.4 |
| | 10 | 20 | | 20 | | | | | | | | | | | bal. | 1.2 |
| | 11 | | 15 | 15 | 15 | | | | | | | | | | bal. | 1.6 |
| | 12 | | 0.5 | 0.5 | | 0.5 | | | | | | | | | bal. | 1.4 |
| | 13 | 4 | 4 | 4 | 4 | 4 | | | | | | | 2.5 | | bal. | 0.9 |
| | 14 | 20 | | | | | | | | | | | 2.5 | | bal. | 0.4 |
| | 15 | 20 | | | | | | 20 | | | | | | | bal. | 2.8 |
| | 16 | 20 | | | | | | 6 | | 6 | 6 | 6 | 6 | | bal. | 0.9 |
| | 17 | 30 | | | | | | | | | | 10 | | | bal. | 0.8 |
| | 18 | 40 | | | | | | 20 | | | | | | | bal. | 2.9 |
| | 19 | 45 | | | | | | | | | | | 0.5 | | bal. | 1.0 |
| | 20 | 10 | | | | | | 10 | | | | 10 | | | bal. | 1.4 |
| | 21 | 10 | | | | | | 5 | 5 | 5 | | | | 5 | bal. | 2.6 |
| | 22 | 5 | | | | | | 6 | | 6 | | 6 | 6 | 6 | bal. | 1.7 |
| | 23 | 0.5 | | | | | | | | | | | 0.5 | | bal. | 0.3 |
| | 24 | 0.5 | | | | | | 5 | | 5 | 5 | 5 | 5 | 5 | bal. | 1.0 |
| | 25 | | 20 | | | | | 20 | | | | | | | bal. | 2.0 |
| | 26 | | | | 20 | | | 20 | | | | | | | bal. | 1.3 |
| | 27 | | | | | 20 | | 20 | | | | | | | bal. | 2.1 |
| | 28 | | | | | | 20 | | | | | | | 5 | bal. | 1.0 |
| | 29 | 10 | | | | 10 | | | 5 | | | | 5 | 5 | bal. | 1.3 |
| | 30 | | 0.5 | | 0.5 | 0.5 | 0.5 | | | | 0.5 | | | | bal. | 1.9 |
| | 31 | 20 | 15 | | | | 5 | | 20 | | | 10 | | | bal. | 1.5 |

TABLE 2

| | |
|---|---|
| Test machine | Thrust washer type friction wear tester |
| Test piece size | 40 mm in length, 40 mm in width, and 1.5 mm in thickness |
| Load | 200 kgF/cm$^2$ |
| Peripheral speed | 0.5 meter/sec. |
| Test time | 2 hours |
| Lubricating oil | Lubricating oil for shock absorber | a substance with which said porous layer is impregnated or impregnated-and-coated, said substance being one selected from the following mixtures (A), (B) and (C);
- (A) a first sintered mixture consisting of 0.1 to 45 vol % of one composition selected from a group consisting of tetrafluoroethylene-ethylene copolymer resin and fluoroethylene propylene ether resin, and the balance substantially polytetrafluoroethylene;
- (B) a second sintered mixture consisting essentially of 0.1 to 45 vol % in total of at least two compositions selected from a group consisting of tetrafluoroetheylene-perfluoroalkylvinyl ether copolymer resin, tetrafluoroethylene-ethylene copolymer resin, and fluoroethylene propylene ether resin, and the balance substantially polytetrafluoroethylene; and
- (C) a third sintered mixture consisting essentially of 0.1 to 40 vol % of at least one composition selected from a group consisting of tetrafluorotheylene-perfluoroalkylvinyl ether copolymer resin, tetrafluoroethylene-ethylene copolymer resin, and fluoroethyelene propylene ether resin; 0.1 to 35 vol % of at least one composition selected from a group consisting of a low-melting point solid lubricant, fibrous materials and ceramics and the balance substantially polytetrafluoroethylene, the total of contents of the compositions other than polytetrafluoroethylene being in a range between 0.2 and 70 vol %.

2. A sliding and bearing material according to claim 1, wherein said backing metal is of a steel strip, while the intermediate layer is a copper plating layer.

3. A sliding and bearing material according to claim 1, wherein said porous metallic layer is of a sintered body of a Cu-base alloy.

4. A sliding and bearing material according to claim 3, wherein said Cu-base alloy is a Cu-Sn-Pb alloy.

5. A sliding and bearing material according to claim 1, wherein the backing metal is devoid of the intermediate layer.

6. A sliding and bearing material according to claim 3, wherein the backing metal is devoid of the intermediate layer.

7. A sliding and bearing material according to claim 4, wherein the backing metal is devoid of the intermediate layer.

8. The sliding and bearing material of claim 1, wherein said substance is mixture (A).

9. The sliding and bearing material of claim 1, wherein said substance is mixture (B).

10. The sliding member of claim 1, wherein
said second sintered mixture consists essentially of 45 vol % in total of at least two compositions selected from a group consisting of tetrafluoroethylene-perfluoroalkylvinyl ether copolymer resin, tetrafluoroethylene-ethylene copolymer resin, and fluoroethylene propylene ether resin, and the balance being polytetrafluoroethylene.

11. The resin of claim 10, wherein said substance is mixture (A).

12. The resin of claim 10, wherein said substance is mixture (B).

13. The sliding and bearing material of claim 1, wherein
said second sintered mixture consists of 45 vol % in total of at least two compositions selected from a group consisting of tetrafluoroethylene-perfluoroalkylvinyl ether copolymer resin, tetrafluoroethylene-ethylene copolymer resin, and fluoroethylene propylene ether resin, and the balance being polytetrafluoroethylene; and
said third sintered mixture consists of 0.1 to 40 vol % of at least one composition selected from a group consisting of resin, tetrafluoroethylene-ethylene copolymer resin, and fluoroethylene propylene ether resin; 0.1 to 35 vol % of at least one composition selected from a group consisting of a low-melting point solid lubricant, fibrous materials and ceramics and the balance being polytetrafluoroethylene, the total of contents of the compositions other than polytetrafluoroethylene being in a range between 0.2 and 70 vol %.

14. The sliding and bearing material of claim 13, wherein said substance is mixture (B).

15. The sliding and bearing material of claim 13, wherein
said first sintered mixture (A) consists of 0.1 to 45 vol % of fluoroethylene propylene ether resin, and the balance being polytetrafluoroethylene.

16. The sliding and bearing material of claim 15, wherein said substance is mixture (A).

* * * * *